(12) United States Patent
Kalisz

(10) Patent No.: US 6,302,357 B1
(45) Date of Patent: Oct. 16, 2001

(54) PRESSURE STABILIZED INFLATED AIR TRANSPORT VEHICLE

(75) Inventor: John B. Kalisz, Newhall, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/648,416

(22) Filed: Aug. 28, 2000

(51) Int. Cl.[7] ........................................................ B64B 1/14
(52) U.S. Cl. ............................ 244/30; 244/125; 244/126
(58) Field of Search ........................ 244/25, 30, 31, 244/32, 33, 125, 126, 128, 117 R, 119, 5; 52/2.25, 2.26

(56) References Cited

U.S. PATENT DOCUMENTS

| | | | |
|---|---|---|---|
| 2,598,696 | * | 6/1952 | Huch ........................................ 244/31 |
| 3,391,883 | * | 7/1968 | Curtis ...................................... 244/31 |
| 3,486,719 | * | 12/1969 | Fitzpatrick et al. ................... 244/125 |
| 3,519,530 | * | 7/1970 | Struble, Jr. ............................. 244/31 |
| 3,651,609 | * | 3/1972 | Bird . | |
| 3,946,127 | * | 3/1976 | Eisenmann et al. ................... 244/133 |
| 4,052,025 | * | 10/1977 | Clark et al. ............................. 244/25 |
| 5,674,586 | * | 10/1997 | Toni et al. ............................ 428/36.3 |

* cited by examiner

Primary Examiner—Galen L. Barefoot
(74) Attorney, Agent, or Firm—Robert A. Schruhl

(57) ABSTRACT

This invention relates to a pressure stabilized inflated air transport vehicle having means for limiting crack propagation in the hull envelope whereby leakage of the gas in the haul due to the crack will not exceed the gas pressure maintaining means.

19 Claims, 2 Drawing Sheets

PRESSURE STABILIZED INFLATED AIR TRANSPORT VEHICLE

FIELD OF THE INVENTION

This invention pertains to means in pressured stabilized inflated air transport vehicles which will limit crack propagation so that escaping gas will not exceed the capabilities of the gas pressure maintaining means such as a pump or the controlled gas escaping from a pressured gas cylinder used to maintain inflation of the vehicle.

BACKGROUND OF THE INVENTION

Lighter than airships and balloons have been known since 1783 when the Montgolfier Brothers Jacques and Joseph made the first successful balloon flight. Ridged airships such as Zeppelins including the Hindenberg, Grafzeppelin, Macon, and Los Angeles differ considerably from blimps and other inflated balloons including hot air balloons. Non-rigid balloons are subject to cracks in the hull envelop which can run a considerable distance and cause the balloon or blimp to crash because the pressure mechanism for maintaining the balloon in flight is insufficient to overcome the leakage caused by the sever crack. Present blimps such as the Goodyear, Sony and Met-Life blimps are limited by regulations to about 150 to 170 feet in length due to the problem of cracks appearing in the hull envelop. A blimp under 170 feet may develop a crack but the safety factor is such that the blimp can land in a short period of time without a catastrophe occurring.

If blimps can be constructed of eight hundred feet or more in length, they can easily transport loads of a million pounds or more very economically and a substantial cost reduction from present fixed winged aircraft. Lighter than air transports can travel much greater distances than present jet fuel aircraft while burning substantially less fuel. Such large non-rigid aircraft can travel faster than cargo carrying ships.

Achieving safety in flight and durability has always been a difficult challenge in pressurized aircraft including fixed wing air vehicles such as modern jets with their pressurized cabins as well as pressure stabilized airships like blimps.

The problems associated with the first commercial jet aircraft, the Comet, are indicative of the hazards of pressurized commercial jets. The energy stored in the pressurized vessel is large, and if a flaw develops, the entire vehicle can be destroyed. Commercial jets have traditionally included bands, (independent of the pressure vessel) that are intended to pick up the load as a crack propagates, and unload the hull material and stop the crack. The Aloa Airlines incident, were a major section of the fuselage left the aircraft, suggests that the method used is marginal.

The airship industry has used a slit coupon test for the last fifty years to ensure the hull material has durability consistent with their purposes. This criteria requires a three inch wide coupon with a one inch wide transverse slit to support a load of three times the design load of the hull. The criteria is empirical in nature and set a standard of safety that was consistent with duty of the intended vehicles. Such vehicles have intended to be used for observation, advertising and light transportation.

As the quest for a more fuel efficient transportation system continues, interest in larger buoyed and semi-buoyed flight mounts. The major stumbling block in the construction of large pressurized stabilized structures is the hull durability issue. Design groups and licensing agencies alike recognize that the current design approaches and licensing criteria are inadequate for large commercial transportation vehicles several hundred feet or more in length and particularly those which run up to eight hundred or one thousand feet.

In present air ships such as blimps, current pressure stabilization is vulnerable to catastrophic deflation from damage of modest size (less than one foot cuts or rips) and are only acceptable to the licensing agencies because of the limited exposure to the general public. Commercial airliner designers have attempted to provide crack stop capability with limited success, but have avoided the safety problems by providing a hull with sufficient strength and life that most damage is minimal and fatigue life is not exhausted before the vehicles are retired. The relatively small size of the fuselage compared to an airship has not at present penalized the vehicles weight to the point of destroying the vehicle's economics.

OBJECTS AND SUMMARY OF THE INVENTION

It is an object of this invention to provide a design approach to the problem of hull durability as applied to commercial airliners and blimps including lighter-than-air vehicles.

Another object of this invention is to provide a crack propagation arrestment mechanism designed to survive the specific damage that a ship might be expected to incur during its lifetime.

Still a further object of this invention is to permit the invention to be applied to all specific sizes of airships and airplanes.

A further object of this invention is that the invention can be applied to commercial jet transports as well as lighter-than-air airships.

Yet a further object of this invention is to provide a rip stop design for large commercial transportation air vehicles which is economical, light weight, and fuel efficient and minimizes catastrophic damage that might occur to a hull by a rip, tear, or other damage to a hull envelop.

In summary, this invention relates to a hull durability and crack arrestment in large pressure stabilized structures as will be noted from the following description and the accompanying drawings in which:

FIG. 1 is a perspective view of the invention;

FIG. 2 is a fragmentary perspective view of a portion of a hull panel of the aircraft shown in FIG. 1 with a portion broken away;

FIG. 3 is an enlarged fragmentary perspective view of a portion of the hull panel as illustrated in FIG. 2, and FIG. 4 is a cross sectional view taken along the lines of 4—4 of FIG. 3 and viewed in the direction of the arrows.

DESCRIPTION OF THE DRAWINGS

The bands 16, 18, 20, 22 and 23 are bonded by thermo-sealing or adhesive or other means to the skin fabric 13 of the panel 8 and FIG. 2 is a typical fragment of the entire hull envelop 12. The bands 20, 22 and 23 all encircle the hull, whereas the bands 16 and 18 run longitudinally therewith.

*VECTRAN® is a liquid crystal aromatic polyester (LCAP) manufactured by Hoechst Celanese.

Figure 1:
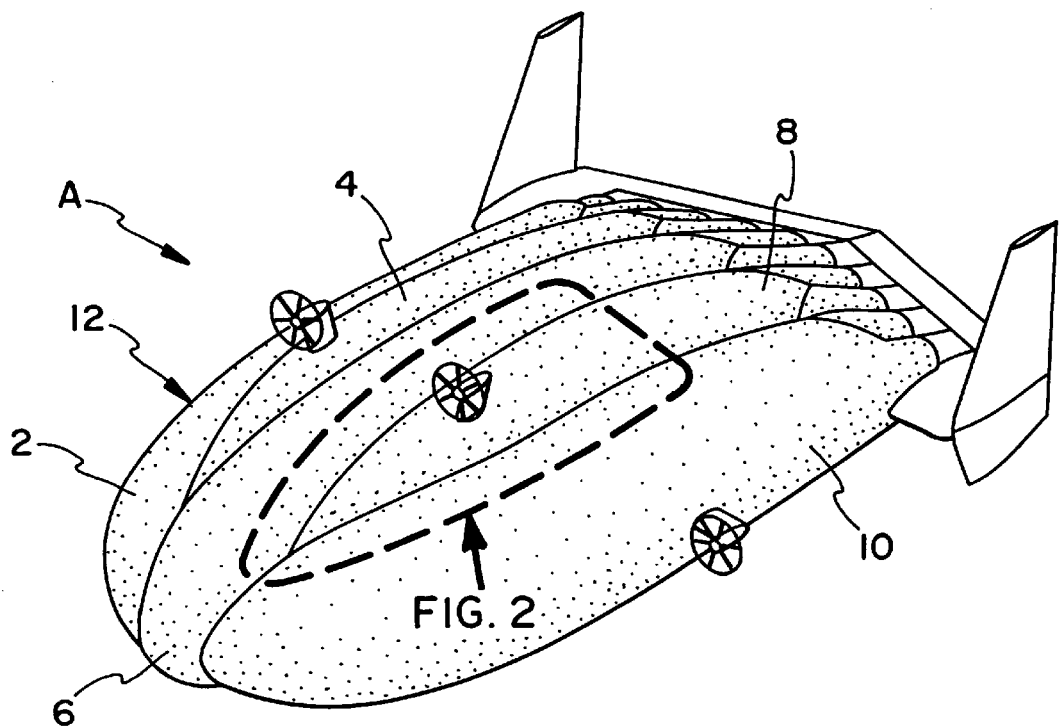
FIG. 1 shows an airship constructed with hull panels 2, 4, 6, 8 and 10 which form a hull envelop 12 having fabric skin 13.
Figure 2:
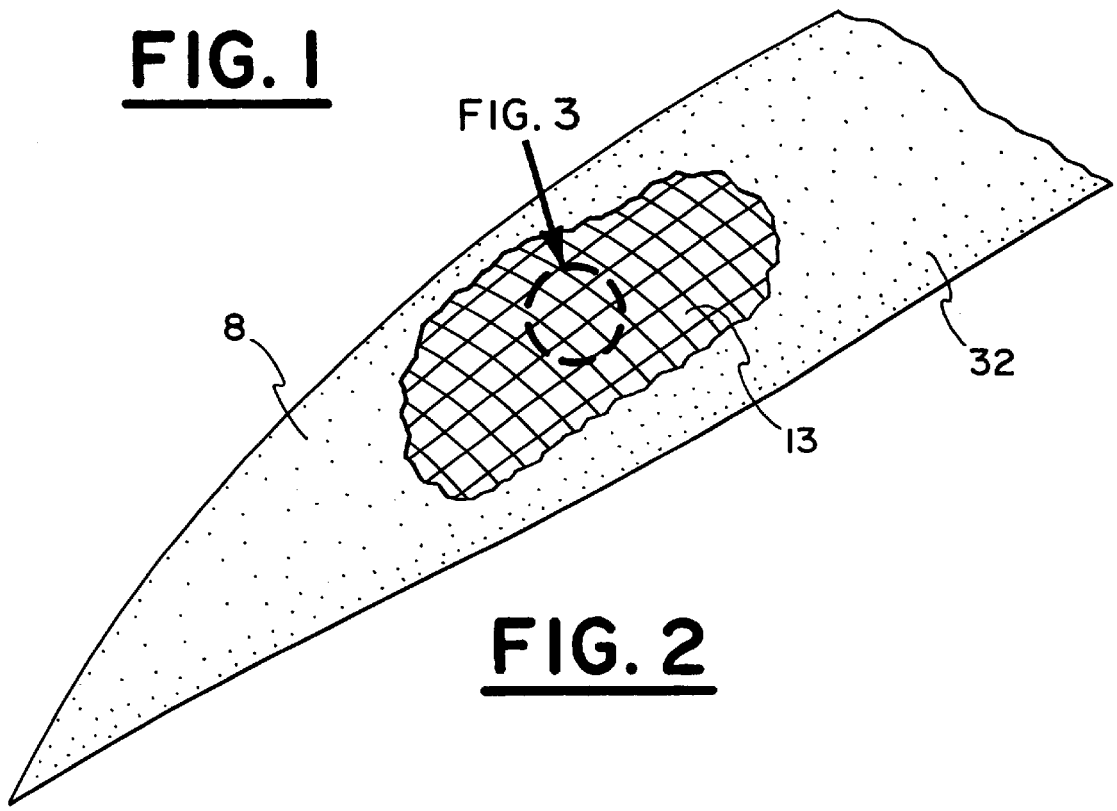
FIG. 2 shows a fragment of panel 8. The various panels 2, 4, 6, 8 and 10 forming the hull envelop 12 are of stiff and creep resistant material skin fabric 13 that takes the primary hull loads. A typical material would be *VECTRAN®. Woven materials with the same characteristics are available such as fibers of graphite, glass, aluminum, titanium and steel which can be used for hull envelop 12 manufacturing. These have little creep or hull operating loads. The fabric skin 13 of panels 2, 4, 6, 8 and 10 are bonded to each other by thermal bonding or a gore seam tape 14. The fabric skin 13 of panels 2, 4, 6, 8 and 10 may be from about 10–12 feet wide depending upon the textile machinery used in the manufacturing of the fabric skin 13 of the hull envelop panels 2, 4, 6, 8 and 10, but are not limited by the length as the machines can produce continuous lengths. Usually 40–50 feet would be of standard length because of the roll size. The thickness of the hull envelop skin fabric 13 material runs between 0.01" and 0.03" with a preferred thickness of 0.02". The gore seam tape 14 is bonded to the underside of the skin fabric 13 of the hull envelop panels 2, 4, 6, 8 and 10 at the juncture thereof. As best shown in FIG. 2, bands 16, 18, 20, 22 and 23 form a series of interconnected polygons 24 on the skin fabric 13.
Figure 3:
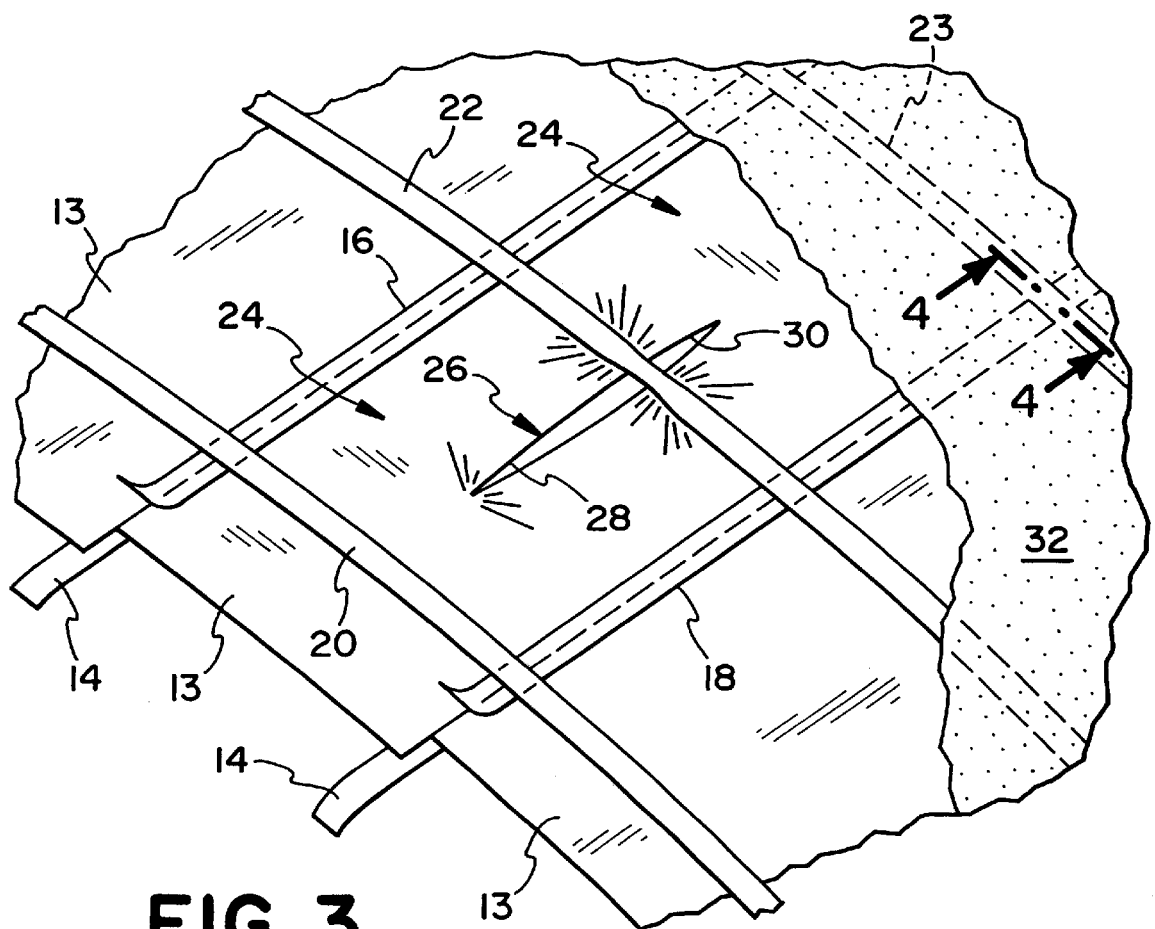
Figure 4:
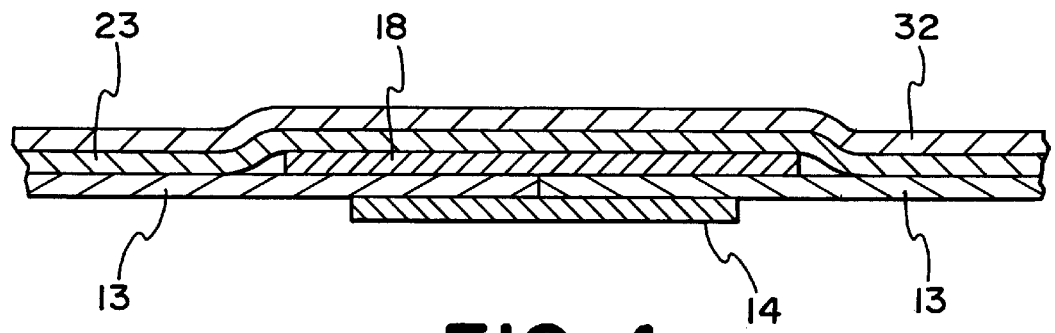

It is obvious that the polygon 24 formed by bands 16, 18, 20, 22 and 23 may not necessarily be four sided as shown, but could be other sided configurations depending upon the feature and configuration of the hull envelop 12. As shown in FIG. 3, a rip 26 has developed in the panel 24 and is propagated from the tip 28 under the band 22 to the point 30 where the rip 26 has stopped. The rip or crack 26 must pass beneath the band 22 which by nature has failed to permit the rip 26 to pass a certain distance to the end of the rip 30. When the rip 26 passes beneath band 22, the thermo-bonding or adhesive gives way slightly, but the band then picks up the load of the rip 26 trying to expand laterally. As the rip or crack 26 expands the adhesive or weld of the band 18 to the hull envelop skin fabric 13 maintains the crack 26 at a minimum allowing only a small portion of the crack 26 to proceed to the adjacent polygon 24.

When vehicle A is initially inflated, the bands 16, 18, 20, 22 and 23 mark off the skin fabric 13 of the hull envelop 12 with indentations where the additional stiffness of the bands 16, 18, 20, 22 and 23 are located. Over the next few months, the bands 16, 18, 20, 22 and 23 of *SPECTRA® with the low creep performance, will strain and give up load until the bands 16, 18, 20, 22 and 23 have stretched so far that they no longer carry a load. As long as the strain limit in the various bands such as 16, 18, 20, 22 and 23 is not abused, the bands 16, 18, 20, 22 and 23 have virtually the same strength as new. The skin fabric 13 of the hull envelop 12 now carries all of the flight and pressured loads. When a flaw such as a crack 24 is introduced into the skin=skin fabric 13 of the skin fabric 13 of the hull envelop 12, the crack or rip 24 will propagate with high stress and stain at the crack tip 28. As the crack approaches a band such as 16, 18, 20, 22 and 23, the band such as 16, 18, 20, 22 and 23 is unloaded (under no stress) and has the ability to pick up the load of the skin fabric 13 of the hull envelop 12 and reduce the stresses at the crack or rip tip 28 and arrest the growth of the rip or crack 26. The reason this occurs is that the band 18 is able to unload itself in the first few months after the initial inflation due to the poor creep performance. The poor creep performance allows it to perform when needed. The life required of the band 18 while under load, is that necessary to complete the flight, since pressure generating pumps or cylinders keep the envelop inflated even though there is some loss of gas to the rip or crack 16. The loss is not sufficient to cause a catastrophe and override the pressure mechanism. Furthermore, the life required of the band 18 while under load, is sufficient to complete the flight because the flight will be of short duration and the poor creep performance of the band 18 material will not allow for greater stretch unless it is under this stress for a sever length of time.

*SPECTRA® is a mechanically elongated gel spun amorphous polyethylene forming on oriented crystalline structure.

Utilization of a material with poor creep performance in the bands such as 16, 18, 20, 22 and 23 allow the system to achieve a state of stress and strain distribution that heretofore has been impossible to build into an assembly. The finite life requirement of the band 18, for example under full load, prevents the creep material from becoming a catastrophe during the emergency.

A—Spectra® is different from most woven materials which try to avoid creep problems i.e. early creep and subsequent ability to take a heavy load with minimum or no creep, but specific woven patterns can be used which mechanically elongate i.e. creep before the fiber align and take a load.

A * Mylar® film 32, as best shown in FIG. 3, covers the skin fabric 13 of the entire hull envelop 12 in order to prevent damage by ultra violet light and small flying objects or the like.

* Mylar®—polyethylene terephthalates U.S. Pat. No. 2,465,319.

While this invention has been described as having a preferred design, it is understood that it is capable of further modification, uses and/or adaptations following in general the principles of the invention and including such departures from the present disclosure has come within known or customary practice in the art to which the invention pertains, and as may be applied to the essential features set forth, and fall within the scope of the invention or the limits of the appended claims.

What is claimed is:

1. A pressure stabilized air transport vehicle having:
    a) a hull envelop including skin fabric crack propagation resistant means;
    b) said air transport vehicle including gas pressure maintaining means;
    c) said hull envelop skin fabric being of stiff and creep resistant material;
    d) said crack propagation resistant means including spaced bands encircling and running lengthwise of said hull envelop skin fabric and secured to said hull envelop skin fabric and forming interconnected polygons covering substantially the entire hull envelop skin fabric;
    e) said bands having poor creep resistance and high tensile strength;
    f) said polygons not exceeding about 10 feet in length and width;
    g) whereby when a crack develops in said hull envelop skin fabric within at least one polygon, said bands of said polygon will limit propagation of the crack permitting the gas pressure maintaining means to maintain a stabilizing pressure in said hull envelop.

2. A pressure stabilized air transport vehicle as in claim 1 and wherein:
    a) said bands are thermally secured to said hull envelop skin fabric.

3. A pressure stabilized air transport vehicle as in claim 2 and wherein:

a) said hull envelop has a first initial inflated state with said bands under load and low creep; and b) said hull envelop having a second subsequent stable inflated state with said bands under no-creep-no load.

4. A pressure stabilized air transport vehicle as in claim 3 and wherein:

a) said second subsequent stable inflated state occurs after a time period of at least about one month or more inflation of said hull envelop.

5. A pressure stabilized air transport vehicle as in claim 4 and wherein:

a) said bands at no-load-no creep in at least one polygon when crack propagation occurs in said hull envelops skin fabric, will pick up the hull envelop skin fabric load reducing stresses at the crack, arresting crack growth by permitting limited band bond failure so that a small amount of the crack will pass under a bond of at least said one polygon while said band on either side of the crack will absorb the lateral stress of the crack thereby preventing widening and lengthening of the crack.

6. A pressure stabilized air transport vehicle as in claim 1 and wherein:

a) said band is not less than about 8 inches wide.

7. A pressure stabilized air transport vehicle as in claim 1 and wherein:

a) said polygon includes sides from 4 feet to 8 feet in length.

8. A pressure stabilized air transport vehicle as in claim 7 and wherein:

a) said polygon is 4 sided.

9. A pressure stabilized air transport vehicle as in claim 1 and wherein:

a) said band is a light weight fiber material from about 0.01" to about 0.03" thick.

10. A pressure stabilized air transport vehicle as in claim 1 and wherein:

a) said hull envelop comprises strips of about 10 to 12 feet in width and a length up to about the length of said pressure stabilized air transport vehicle.

11. A pressure stabilized air transport vehicle as in claim 10 and wherein:

a) said strips of hull envelop are secured together by thermo-welded gore strips from about 4" to 8" wide.

12. A pressure stabilized air transport vehicle as in claim 11 and including:

a) UV film overlying said skin fabric of said hull envelop and said bands and bonded thereto.

13. A pressure stabilized air transport vehicle as in claim 12 and wherein:

a) said UV film is a polyethylene terephthalate.

14. A pressure stabilized air transport vehicle as in claim 1 and wherein:

a) said hull envelop skin fabric is of woven fibers from the group consisting of liquid crystal aromatic polyester, graphite, glass, aluminum, titanium and steel.

15. A pressure stabilized air transport vehicle as in claim 1 and wherein:

a) said bands are of woven fibrous material which mechanically elongates before the fibers align and take a load.

16. A pressure stabilized air transport vehicle as in claim 1 and wherein:

a) said pressure stabilized air transport vehicle is a gas inflated non-ridged airship.

17. A pressure stabilized air transport vehicle as in claim 1 and wherein:

a) said pressure stabilized air transport vehicle is a jet airplane.

18. A pressure stabilized air transport vehicle as in claim 1 and wherein:

a) said bands have a strength substantially equivalent to 20 feet of hull limit load.

19. A pressure stabilized air transport vehicle as in claim 5 and wherein:

a) said band at said crack must fail to permit said band adjacent said crack to transfer rip load to said band adjacent said crack to prevent widening of said crack.

* * * * *